United States Patent [19]
Holbrook

[11] Patent Number: 5,420,565
[45] Date of Patent: May 30, 1995

[54] ELECTRONIC PRNODDL DISPLAY SYSTEM

[75] Inventor: Gerald L. Holbrook, Rochester, Mich.

[73] Assignee: Chrysler Corporation, Highland Park, Mich.

[21] Appl. No.: 67,543

[22] Filed: May 26, 1993

[51] Int. Cl.$^6$ .............................................. G06F 17/00
[52] U.S. Cl. .................. 340/456; 74/DIG. 7; 364/424.1
[58] Field of Search .............. 74/DIG. 7; 340/456; 364/424.1; 116/28.1, DIG. 20

[56] References Cited

U.S. PATENT DOCUMENTS

| | | | |
|---|---|---|---|
| 3,898,401 | 8/1975 | Noba et al. | 200/61.91 |
| 3,943,792 | 3/1976 | Sibeud | 74/473 R |
| 4,439,833 | 3/1984 | Yamaguchi et al. | 340/456 |
| 4,610,179 | 9/1986 | Parker | 74/335 |
| 4,660,430 | 4/1987 | Bortfeld et al. | 74/335 |
| 4,935,872 | 6/1990 | Benford et al. | 364/424.1 |
| 4,998,450 | 3/1991 | Nogle | 477/99 |
| 5,009,128 | 4/1991 | Seidel et al. | 74/DIG. 7 |

FOREIGN PATENT DOCUMENTS 60-40856  3/1985  Japan ............................... 74/DIG. 7

Primary Examiner—John J. Vrablik
Attorney, Agent, or Firm—Mark P. Calcaterra

[57] ABSTRACT

The present invention provides an apparatus for indicating transmission operating mode based upon actual operating mode as determined by the transmission controller. The apparatus receives input signals from the PRNODDL switch of the electronically controlled automatic transmission in addition to pressure switch and speed data to determine and confirm transmission operating mode. The signals are processed by the automatic transmission controller and communicated to the instrument cluster for displaying transmission operating mode.

20 Claims, 9 Drawing Sheets

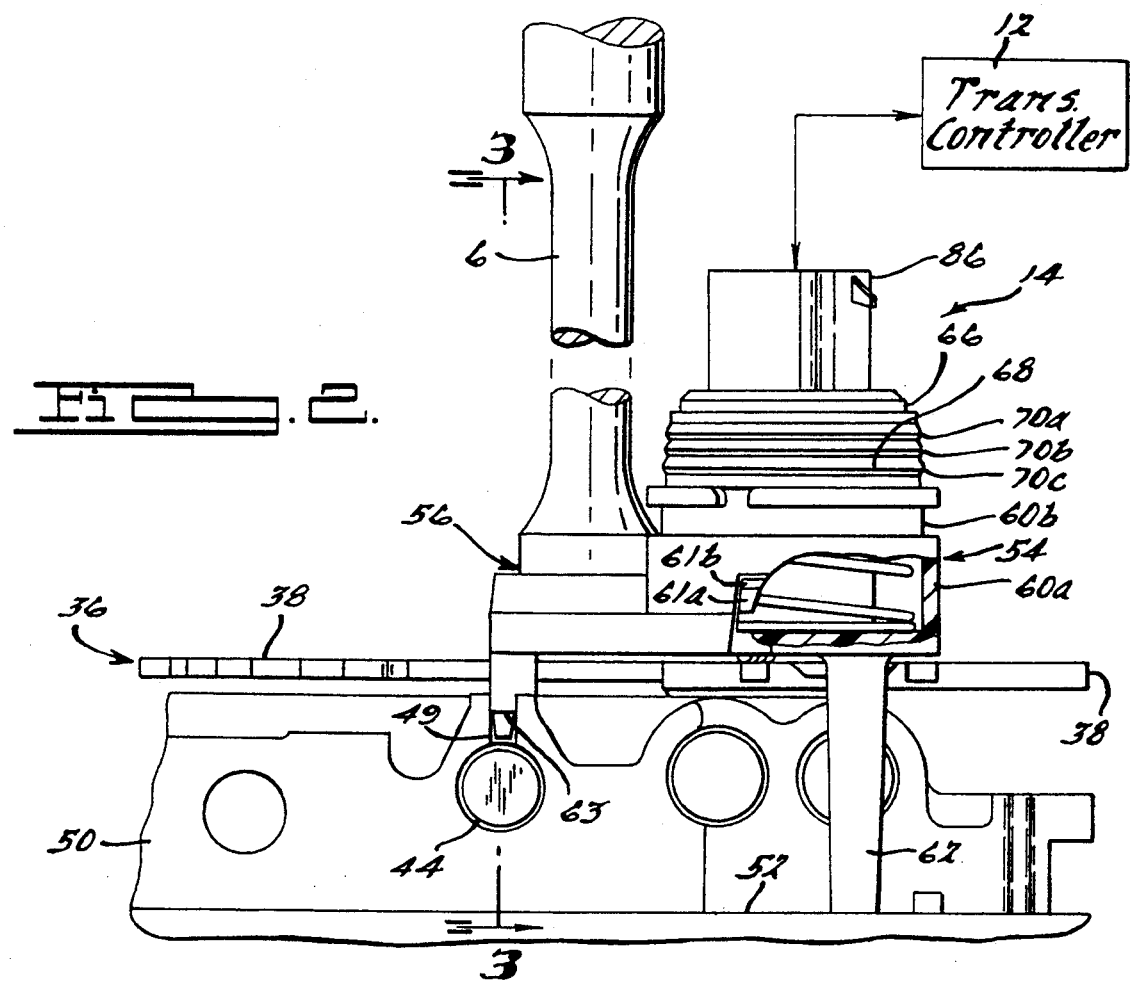
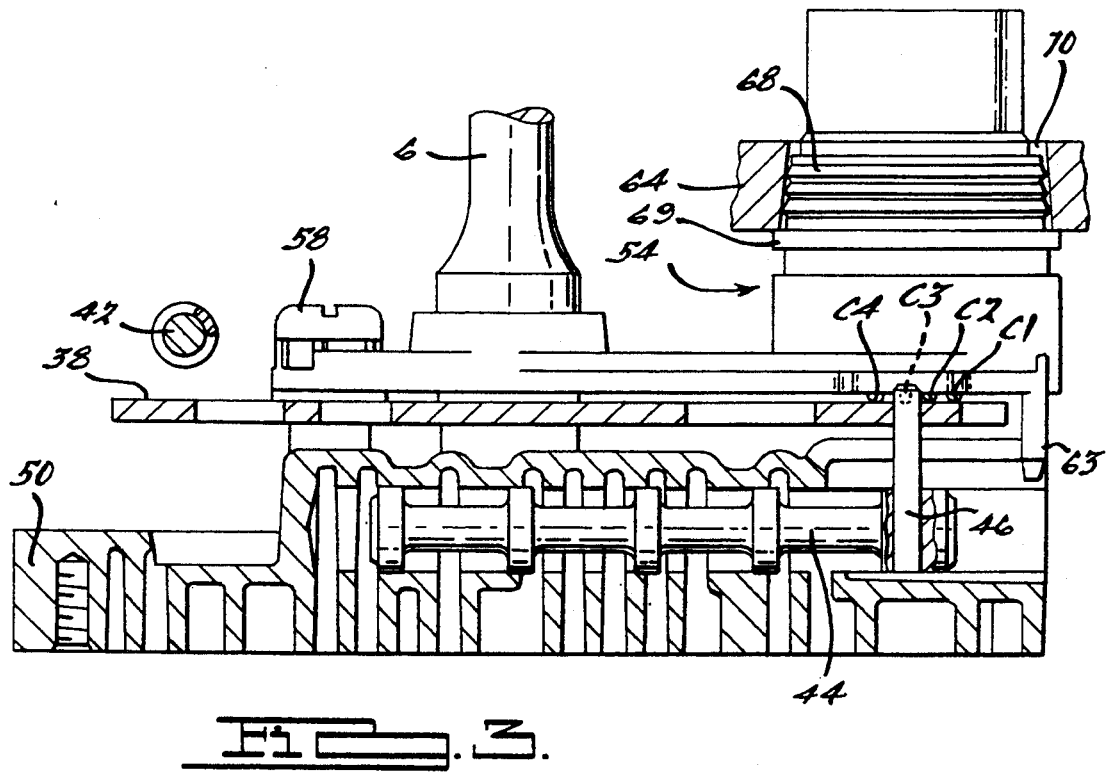

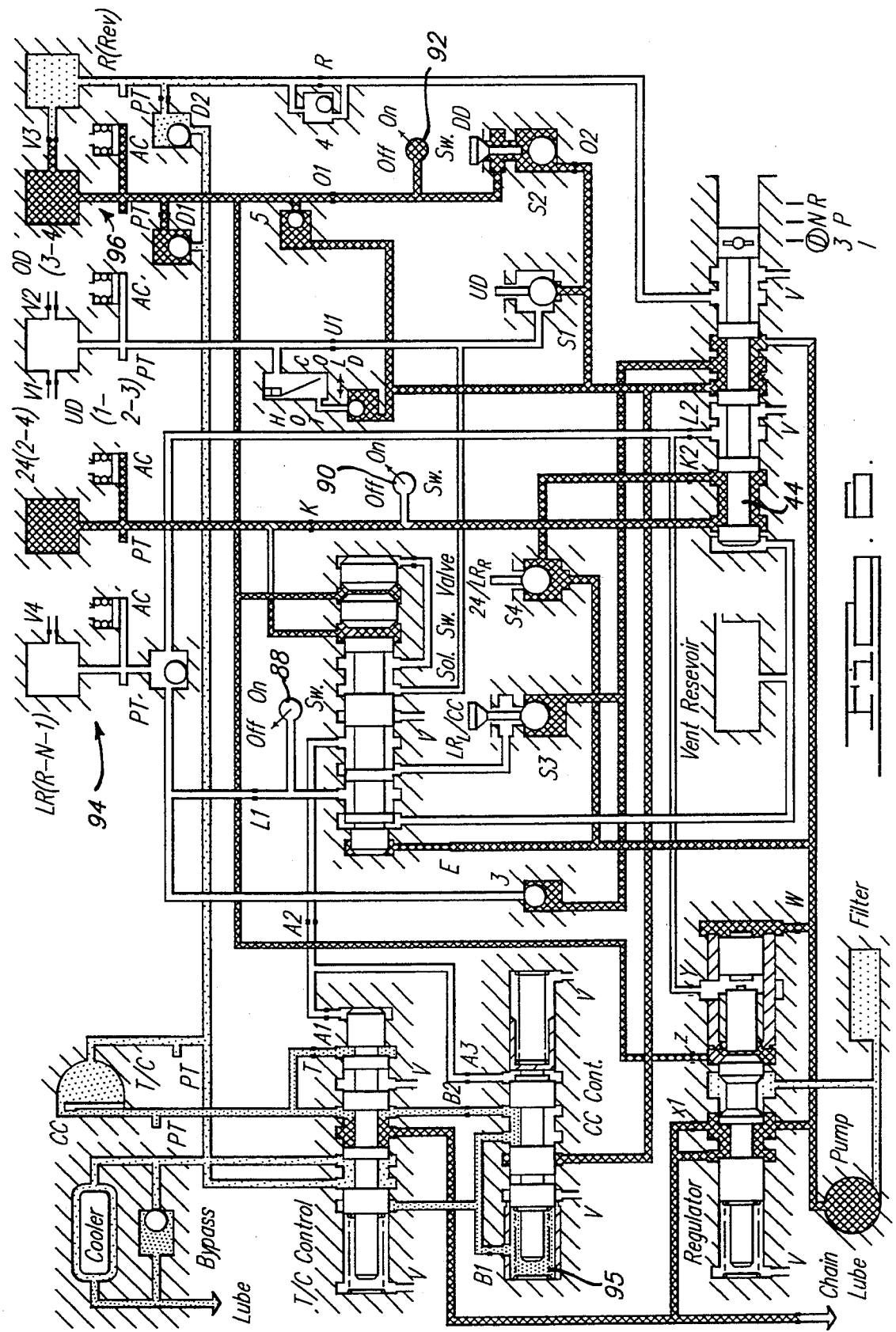

ELECTRONIC PRNODDL DISPLAY SYSTEM

FIELD OF THE INVENTION

The present invention relates to an automatic transmission primarily intended for motor vehicle use, and more particularly to a system for electronically displaying the transmission operating mode in a transmission that is controlled electronically and hydraulically.

DESCRIPTION OF RELATED ART

In recent years, advanced forms of transmission control have been proposed which offer the possibility of enabling an automatic transmission to adapt itself to changing conditions. In this regard, U.S. Pat. No. 3,956,947, issued on May 18, 1976 to Leising, et al, sets forth a fundamental development in this field. Specifically, this patent discloses an automatic transmission design which features an "adaptive" control system that includes electronically operated solenoid-activated valves for controlling certain fluid pressures.

Currently, there exists a comprehensive four-speed automatic transmission system which features fully adaptive electronic control. A thorough discussion of such a transmission control system is contained in U.S. Pat. No. 4,965,735 issued on Oct. 23, 1990 to Leising et al and entitled "Method of Determining the Shift Lever Position of an Electronic Automatic Transmission" and U.S. Pat. No. 4,998,450 to Nogle and entitled "Neutral Start Switch To Sense Shift Lever Position", which are commonly owned by the assignee of the present application. These patents are hereby incorporated by reference. The transmission control system disclosed therein includes a microcomputer-based controller which receives input signals indicative of engine speed, turbine speed, output speed (vehicle speed), throttle angle position, brake application, predetermined hydraulic pressures, driver selected gear and operating conditions (PRNODDL), engine coolant temperature, and/or ambient temperature. The controller generates command or control signals for causing the actuation of a plurality of solenoid-actuated valves which regulate the application and release of pressure to and from the frictional units of the transmission system.

The above transmission control system further discloses a neutral start switch for sensing the position of a manually operated shift lever to select between a plurality of predetermined operating modes. With reference to FIGS. 4B and 19 of the Nogle patent, a plate member moves in response to a shift lever and provides a cam surface at the edge with electrically conductive and non-conductive areas. A pair of separate sensors are mounted in the transmission such that an electrical contact pin of each sensor communicates with the cam surface. The signal from the electrical contact pin of each sensor combine to generate a binary code indicative of the shift lever position. Each sensor has a first contact and a second contact. The first contact travels on the cam surface while the second contact closes whenever the first contact is extended within a groove. However, this technique eliminates some of the possible binary code combinations since the first contact generally does not conduct with the second contact closed. As a result, changes between some of the manual shift lever operating positions involve single bit changes between the respective binary code combinations.

U.S. patent application Ser. No. 07/877,457 filed By Nogle et al on May 1, 1992, now U.S. Pat. No. 5,325,083, and entitled "Manual Valve Position Sensing System" discloses an improved sensing system for detecting the position of a manually operated shift lever which enables the vehicle operator to select between a plurality of predetermined operating modes in an automatic transmission. The sensing system includes a plate member movable in response to movement of a shift lever and which is also provided with a predominantly flat contact surface having a plurality of electrically conductive and non-conductive areas arranged in a predetermined pattern. An electrical sensor unit is mounted in the transmission in a position to communicate with the contact surface of the plate member. A plurality of electrical contact pins engage the conductive and non-conductive areas on the contact surface and generate a binary code having combinations thereof which represent each of the shift lever positions. Binary code combinations are provided for the operating modes and require at least a two bit change between any two operating modes. In addition, transition codes are provided between each of the operating modes. The binary codes are provided to the transmission controller which compares the codes with predetermined position coding. The disclosure of this commonly assigned U.S. Patent Application is hereby incorporated by reference.

Furthermore, transmissions generally include a way of indicating to the vehicle operator what the operating mode of the transmission is, i.e., whether the transmission is in park, reverse, overdrive, etc. Some transmissions incorporate mechanical linkages and cables connected to the shifting mechanism of the transmission to further actuate an indicator inside the vehicle. More recently, vehicle manufacturers are adapting transmissions with electronic switch or sensing means which sense the position of the transmission shifting mechanism and provides an electronic signal indicative of transmission operating mode. A disadvantage of such systems is that it is difficult to physically synchronize the linkage or switch input events with the actual transmission hydraulic changes, for example, when the transmission is shifted from neutral to overdrive. If the linkages or switches are not well synchronized with the transmission hydraulic changes, misalignments can produce inaccurate indications of transmission operating mode. Therefore, some manufactures further adapt the system to provide no indication when the transmission is shifted through these transition regions.

SUMMARY OF THE INVENTION

It is therefore, one objective of the present invention to provide in an electronically controlled automatic transmission an apparatus for indicating transmission operating mode based upon the actual operating mode of the transmission as determined by the transmission controller using the PRNODDL switch inputs as well as pressure switch and speed data to confirm the position.

It is a further objective of the present invention to provide an apparatus which avoids inaccurate indications of the transmission operating mode, while still providing indication to the vehicle operator of the actual transmission operating mode.

To achieve the foregoing objectives, the present invention provides an apparatus for indicating transmission operating mode based upon actual operating mode as determined by the transmission controller. The apparatus receives input signals from the PRNODDL switch of the electronically controlled automatic transmission in addition to pressure switch and speed data to determine and confirm transmission operating mode. The signals are processed by the automatic transmission controller according to the method of the present invention and a signal indicating present transmission operating mode is communicated to the instrument cluster for display.

BRIEF DESCRIPTION OF THE DRAWINGS

FIG. 2 is an elevation view of a manual valve position sensing assembly in accordance with the present invention;

FIG. 3 is a cross-sectional view of the manual valve position sensing assembly taken along line 3—3 of FIG. 2;

FIG. 6 is a hydraulic control system schematic illustrating the manual valve and the pressure switches;

FIGS. 8a and 8b are a flowchart for a method of detecting errors in the manual valve sensor output data;

FIG. 9 is a table used in conjunction with the method of the present invention for determining the engine off PRNODDL display;

FIG. 10 is a table used in conjunction with the method of the present invention for determining the shift lever position;

DETAILED DESCRIPTION THE INVENTION

The present invention is a system for electronically displaying the transmission operating mode based upon a manual valve sensor switch, hydraulic pressure switches and transmission input and output speed data. The method provides for displaying transmission operating mode based upon a first set of sensor data when the vehicle is operating under a first set of conditions and based upon a second set of sensor data when the vehicle is operating in a second mode.

Figure 1:
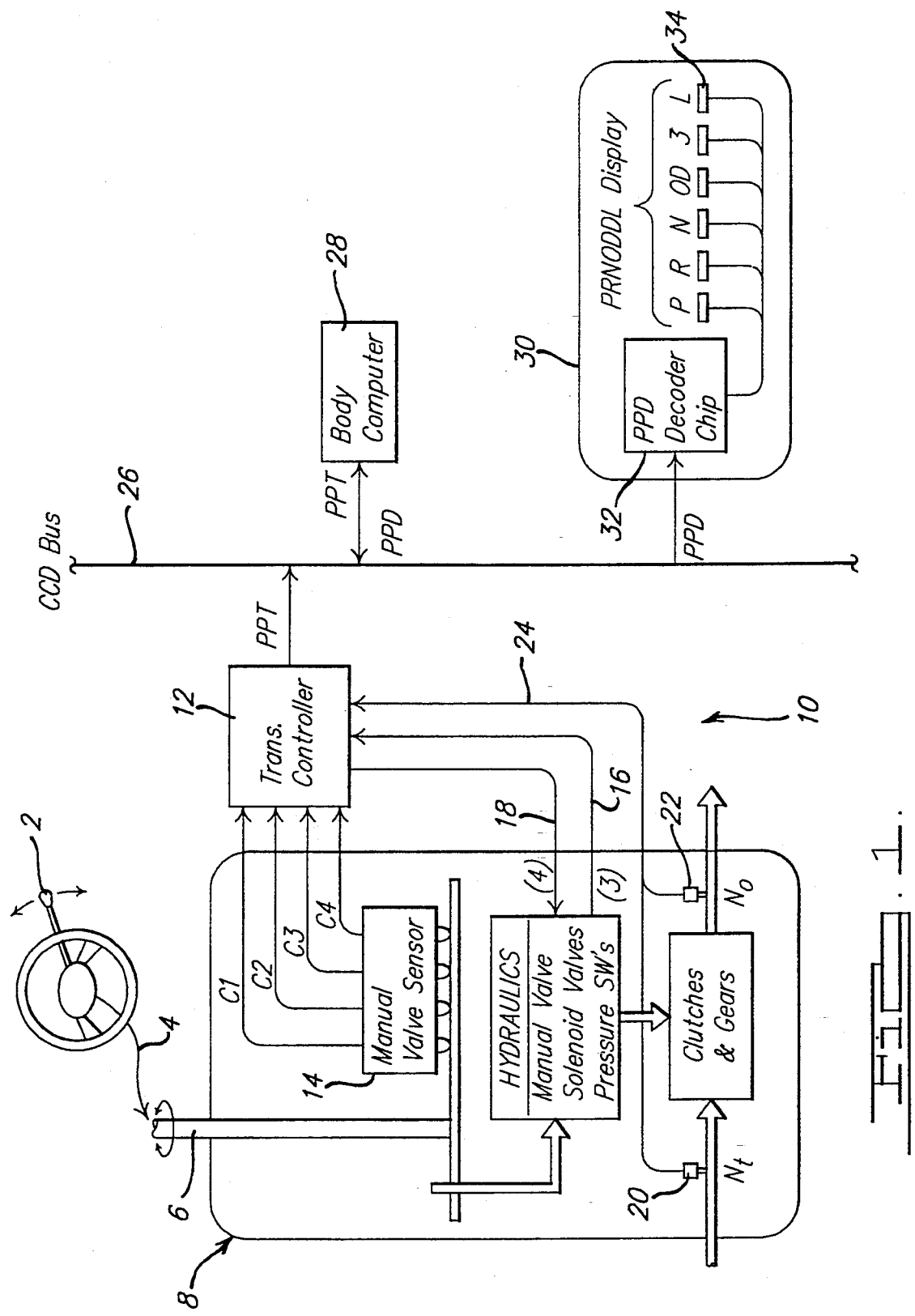
FIG. 1 is a block schematic of the electronic PRNODDL display system of the present invention.

With reference to FIG. 1, a vehicle operator selects a transmission operating mode by manipulating shift lever 2 which acts upon cable or linkage 4. Linkage 4, in turn, acts on a rotatable shift shaft 6 which is associated with a transmission 8 in order to cause a desired change in the transmission operating mode. In accordance with a preferred embodiment of the present invention, the electronic PRNODDL display system 10 is shown in schematic form and includes a transmission controller 12 which receives 4 bit binary sensor data from a manual valve position sensor 14 over communication lines C1, C2, C3 and C4. Transmission controller 12 also receives pressure switch data from pressure switches 88–92 (FIG. 6) over communication lines 16 and actuates electronically controlled solenoid valve assemblies via communication lines 18. Further input data includes turbine speed data, Nt, and transmission output speed data, No, from sensors 20 and 22 via communication lines 24.

The transmission control module 12 processes the sensor data and determines the transmission operating mode according to the method of the present invention. Once determined, a signal indicating the transmission operating mode is sent via the vehicle serial data bus 26 to the body computer 28 where the signal is further processed before being communicated, once again via serial data bus 26, to the instrument panel electronic PRNODDL display 30. Instrument panel electronic PRNODDL display 30 includes a PRNODDL position display (PPD) decoder circuit 32 for receiving and decoding the transmission operating mode signal and for illuminating the appropriate transmission mode indicator light, shown for example at 34, in a well known manner.

An appropriate vehicle serial data bus structure is represented by the Chrysler Collision Detection ("C²D") Serial Data Bus. This technology is described in the following publications and patents: SAE paper No. 860389, entitled "Chrysler Collision Detection (C²D)-A Revolutionary Vehicle Network", by Frederick O. R. Miesterfeld, 1986; SAE paper No. 890529, entitled "The All-Adaptive Controls for the Chrysler Ultradrive Transaxle", 1989; U.S. Pat. No. 4,706,082, entitled "Serial Data Bus For Intermodule Data Communications," which issued on Nov. 10, 1987; and U.S. Pat. No. 4,719,458, entitled "Method of Data Arbitration and Collision Detection In A Data Bus," which issued on Jan. 12, 1988; and U.S. Pat. No. 4,739,323, entitled "Serial Data Bus For Serial Communication Interface (SCI), Serial Peripheral Interface (SPI) and Buffered SPI Modes of Operation," which issued on Apr. 19, 1988; and U.S. Pat. No. 4,739,324, entitled "Method for Serial Peripheral Interface (SPI) in a Serial Data Bus," which issued on Apr. 19, 1988; and U.S. Pat. No. 4,742,349 entitled "Method for Buffered Serial Peripheral Interface (SPI) in a Serial Data Bus", which issued on May 3, 1988. These co-assigned patents and the identified publications are all hereby incorporated by reference. It should also be appreciated that the processing accomplished by body computer 28 could be completed within the transmission controller 12 or within instrument panel electronic PRNODDL display 30 if suitably equipped with processing means. The preferred embodiment advantageously uses the processing capabilities of body computer 28 for accomplishing the required processing.

Figure 4:
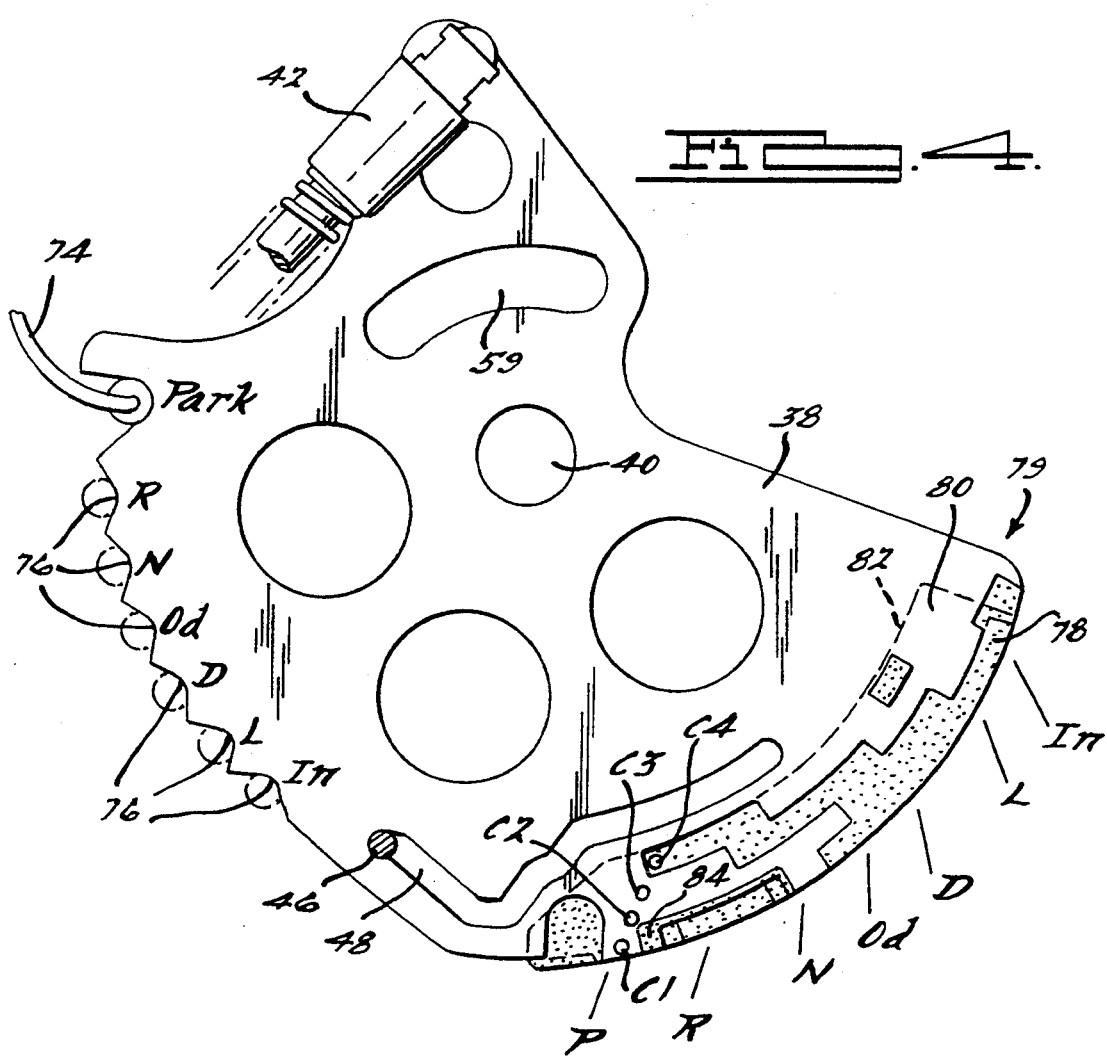
FIG. 4 is a plan view of a shift lever with a plate member having a contact surface composed of conductive and non-conductive areas in accordance with the present invention.

Turning to FIGS. 2–5, manual valve lever position sensor 14 is shown for sensing the position of a manual gear select lever in an automatic transmission. Manual valve lever position sensor 14 is fully disclosed and described in the aforementioned U.S. patent application Ser. No. 07/877,457, now U.S. Pat. No. 5,325,083, and will be briefly described as follows. The manual valve lever position sensor 14 includes a manual valve lever assembly 36 which has a metal plate 38 connected to shift shaft member 6. Shift shaft member 6 is generally mounted within a support structure (not shown) having an opening which allows for rotational movement of the manual valve lever assembly 36. The manual valve lever assembly 36 is attached to shift linkage 4 which is movable by a vehicle operator manipulating shift lever 2 to select amongst a plurality of transmission operating modes such as park, reverse, neutral, overdrive, drive and low (PRNODDL). FIGS. 3 and 4 also show that a Park pawl rod 42 is connected to the metal plate 38 to permit actuation of the Park pawl rod by the manual valve lever assembly 36.

The manual valve lever assembly 36 rotates in response to an operator input amongst positions which generally represent operating modes for an electronically controlled automatic transmission. In doing so, the manual valve lever assembly 36 has a cam surface composed of a slot or cam groove 48 formed on the metal plate 38 as shown in FIG. 4 which engages a valve pin 46. The valve pin 46 is connected to a manually operated valve 44 for controlling the hydraulic fluid flow throughout a valve assembly 50 in an automatic transmission. As such, the rotation of the manual valve lever assembly 36 causes the cam groove 48 to move the manually operated valve 44 to predetermined positions which in turn controls the hydraulic fluid system of the transmission.

A sensing unit 54 is mounted above a portion of the metal plate 38 for sensing the position of the manual valve lever assembly 36. The sensing unit 54 has an opening 56 through which the shaft member 6 extends. The sensing unit 54 is fastened to the valve assembly 50 via a shouldered screw or bolt 58. A slot 59 is provided in the metal plate 38 as shown in FIG. 4 which allows lever assembly 36 to rotate about the shaft member 6 while the sensing unit 54 remains stationary. The sensing unit 54 includes a two-piece plastic housing which is comprised of members 60a and 60b. The member 60a includes a pair of diametrically opposed openings 61a in the vertical cylindrical wall which enable a snap fit connection with a pair of sloping ribs 61b on the corresponding cylindrical wall of the member 60b when the member 60b is inserted into the member 60a.

The sensing unit 54 further includes four spring loaded electrical contact pins C1 through C4 which extend therefrom and contact conductive and non-conductive areas on a contact surface on metal plate 38. In this regard, it should be understood that the electrical contact pins C1 through C4 extend in a generally perpendicular relationship to the plane of the plate 38. The sensing unit 54 further includes a support member 62 which abuts a base plate 52 on the valve assembly unit 50. The support member 62 thereby supports and stabilizes the sensing unit 54 and provides substantially uniform contact between each of the electrical contacts C1 through C4 and the metal plate 38. In addition, the sensing unit 54 has an arm member 63 for engaging a groove 49 through which valve pin 46 moves above the manually operated valve 44. As such, the arm member 63 allows for proper alignment of the sensing unit 54 with the manual valve lever assembly 36 and further prevents undesirable movement.

A top view of the manual valve lever assembly 36 with the plate member 38 is shown in FIG. 4. The manual valve lever assembly 36 has a cam groove 48 routed through the metal plate 38 to provide the cam surface for receiving the manually operated valve pin 46. As such, rotation of the manual valve lever assembly 36 causes the valve pin 46 to move the manually operated valve 44 back and forth in accordance with predetermined valve settings. The manual valve lever assembly 36 further has notches formed on the outer edge of the metal plate 38 for engaging a detent spring 74. As the manual valve lever assembly 36 is rotated, the detent spring 74 engages operating notches 76 for each of the operating modes (PRNODDL) and further for an installation mode (In).

The manual valve lever assembly 36 has non-conductive plastic 78 molded onto an outer portion of the metal plate 38. The metal plate 38 in conjunction with the non-conductive plastic 78 forms a contact surface 79 with conductive areas 80 and non-conductive areas 78 positioned in a pattern which is designed to cooperate with the contacts C1 through C4 in creating the desired binary code. The non-conductive plastic 78 is molded substantially flush to the top surface of the metal plate 38 with the exception of a groove 84 formed below contact C1 when in the reverse operating mode. The non-conductive plastic 78 is further molded to the bottom surface of the metal plate 38 as shown by dotted line 82. As such, the conductive areas 80 and non-conductive areas 78 are easily moved against the electrical contacts C1 through C4.

The manual valve lever assembly 12 is shown in FIG. 4 while engaged in the park operating mode. As the manual valve lever assembly 36 is moved between the plurality of operating modes, the conductive area 80 and non-conductive areas 78 travel against the electrical contacts C1 through C4. In doing so, the sensing unit 54 senses either conductive or non-conductive contact for each of the electrical contacts C1 through C4. Electrical contact with a conductive area 80 grounds the electrical contact and thereby generates a binary code "0". In contrast, electrical contact with a non-conductive area 78 generates a binary code "1". The binary codes generated by each of electrical contacts C1 through C4 are then provided the transmission controller 12.

Figure 5:
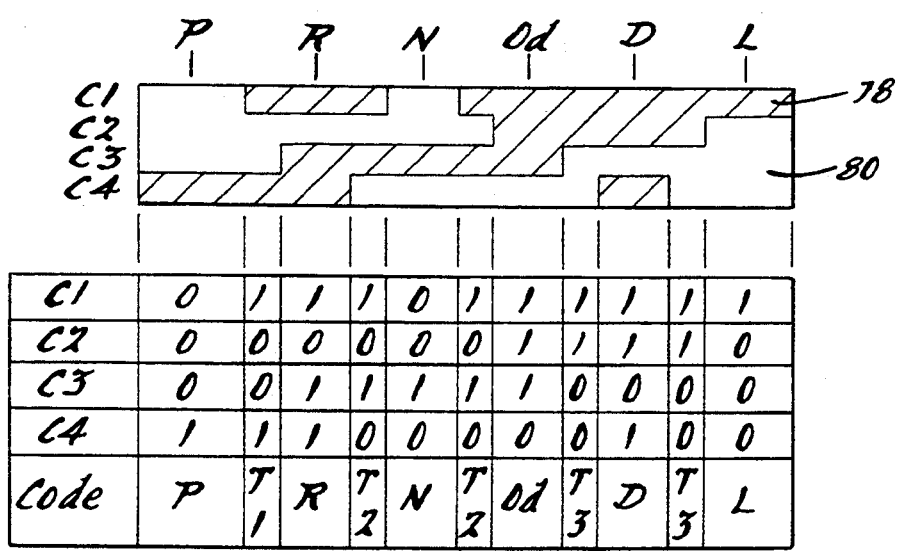
FIG. 5 is a schematic diagram and associated table which illustrates the combinations of binary codes generated in response to the conductive and non-conductive areas on the contact surface.

The binary coded combinations are illustrated in the table in FIG. 5. Discreet binary coded combinations are provided for hard events or operating modes which include park (P), reverse (R), neutral (N), over-drive (OD), drive (D) and low (L). In addition transition codes T1, T2 and T3 are generated between each of the operating modes. To move from one operating mode to any other operating mode the binary code combinations require at least a two bit change. The requirement of a two bit change provides additional assurance that the shift lever position is properly sensed and creates less of a likelihood of obtaining an incorrect position sensing due to a single contact failure. Likewise, a two bit change is required between each of the transition codes T1, T2 and T3. In addition, the combinations of binary codes preferably do not include combinations of either all binary coded zeros or all binary coded ones.

The transition codes T1, T2 and T3 allow for the transmission controller 12 to detect transitions between given operating modes. The transition codes T1, T2 and T3 essentially provide for hysteresis between each of the operating mode positions (PRNODDL). In addition, transition codes T1 and T2 separate the three hydraulic modes of operation which are reverse (R), neutral (N) and drive (OD, D and L) and thereby provide the controller 12 with known regions where hydraulic port changes are expected to occur. As a result, transition code T1 includes the hydraulic port changes between park (hydraulic neutral provided in park) and reverse while transition T2 includes changes between reverse, neutral and drive hydraulic porting. Furthermore, transition T3 provides hysteresis between the overdrive, drive and low operating modes, as no port changes occur within the T3 code.

In operation, the manual valve position sensing assembly 14 monitors and determines the position of the manual valve lever assembly 36. A vehicle operator manually moves the manual valve lever assembly 36 via shift lever 2, linkage mechanism 4 and shaft 6 to select amongst a plurality of operating modes (PRNODDL). In doing so, the manual valve lever assembly 36 rotates beneath the sensing unit 54 so that the electrical contacts C1 through C4 thereby contact conductive and non-conductive areas 80 and 78 to generate combinations of binary codes which represent the position of the manual valve lever assembly 36. The combinations of binary codes provide for operating codes which are separated by transition codes T1, T2 and T3. The binary coded combinations are then provided to the transmission controller 12. A suitable terminal connector 86 is provided for electrically connecting manual valve lever position sensor 14 to transmission controller 12.

With reference to FIG. 6, the hydraulic control system for the electronically and hydraulically controlled automatic transmission is shown schematically and illustrated therein is low/reverse pressure switch (LRP) 88, 2/4 pressure switch (2/4P) 90 and overdrive pressure switch (ODP) 92. The operation of the pressure switches 88–92 is more fully disclosed and described in the aforementioned U.S. Pat. No. 4,965,735 with particular reference to FIGS. 5a–5l. Pressure witches 88–92 are operable to identify the hydraulic operating modes of the automatic transmission according to the following table:

| HYDRAULIC MODE | LR | 2/4 | OD |
|---|---|---|---|
| P/N | ON/OFF | N/C | N/C |
| R | N/C | N/C | N/C |
| OD,D,L | ON/OFF | ON/OFF | ON/OFF |

The SLP method determines the hydraulic mode by looking to the pressure switch output. That is, during the SLP test, the controller looks for the whether the pressure switch turns on and off in response to a solenoid-actuated valve being turned on and off. If the appropriate responses are received, then the hydraulic mode is determined.

Figure 7A:
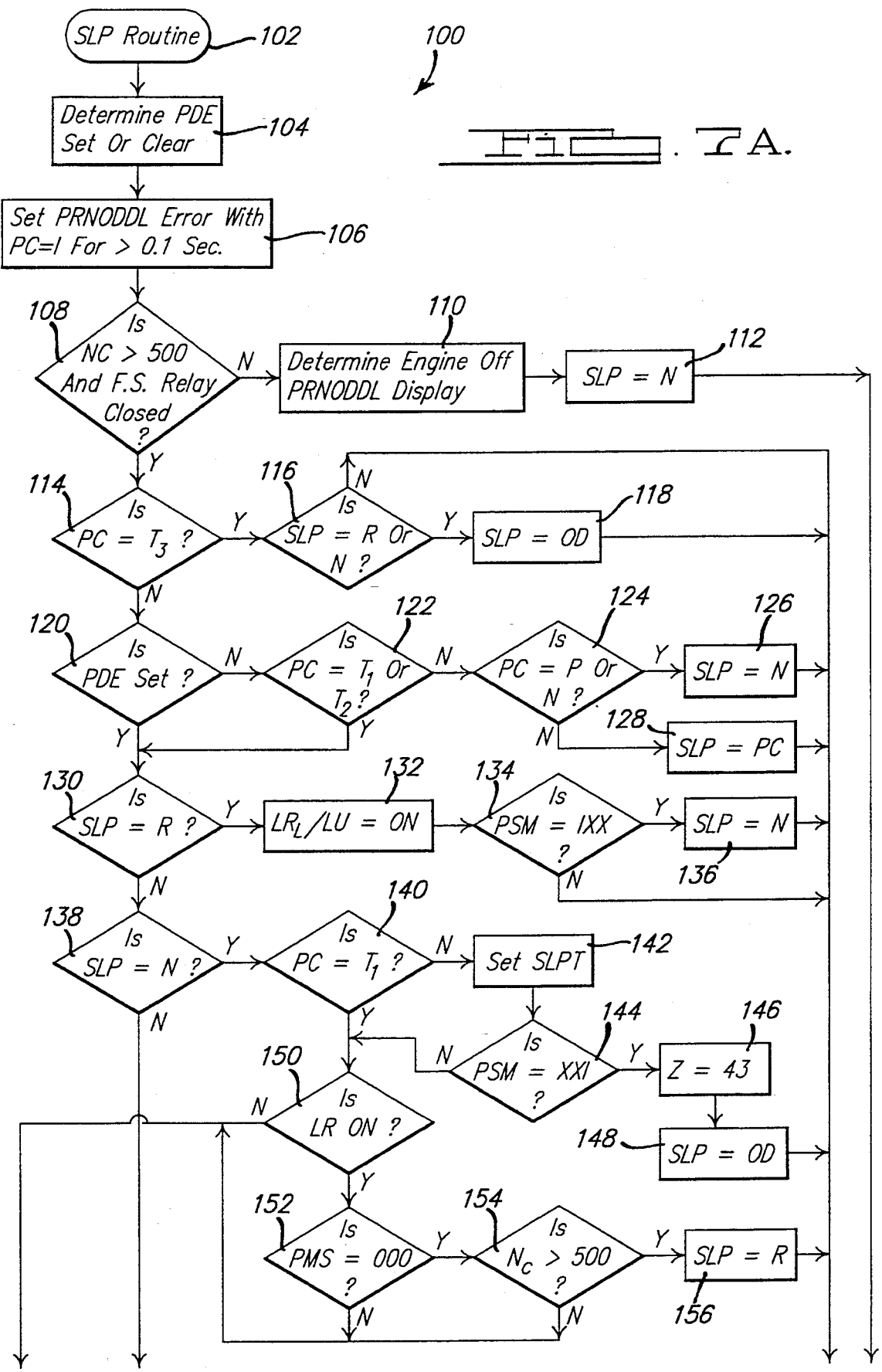
FIGS. 7a and 7b are a flowchart for a method of determining transmission operating mode based upon actual transmission hydraulic operating mode.
Figure 7B:
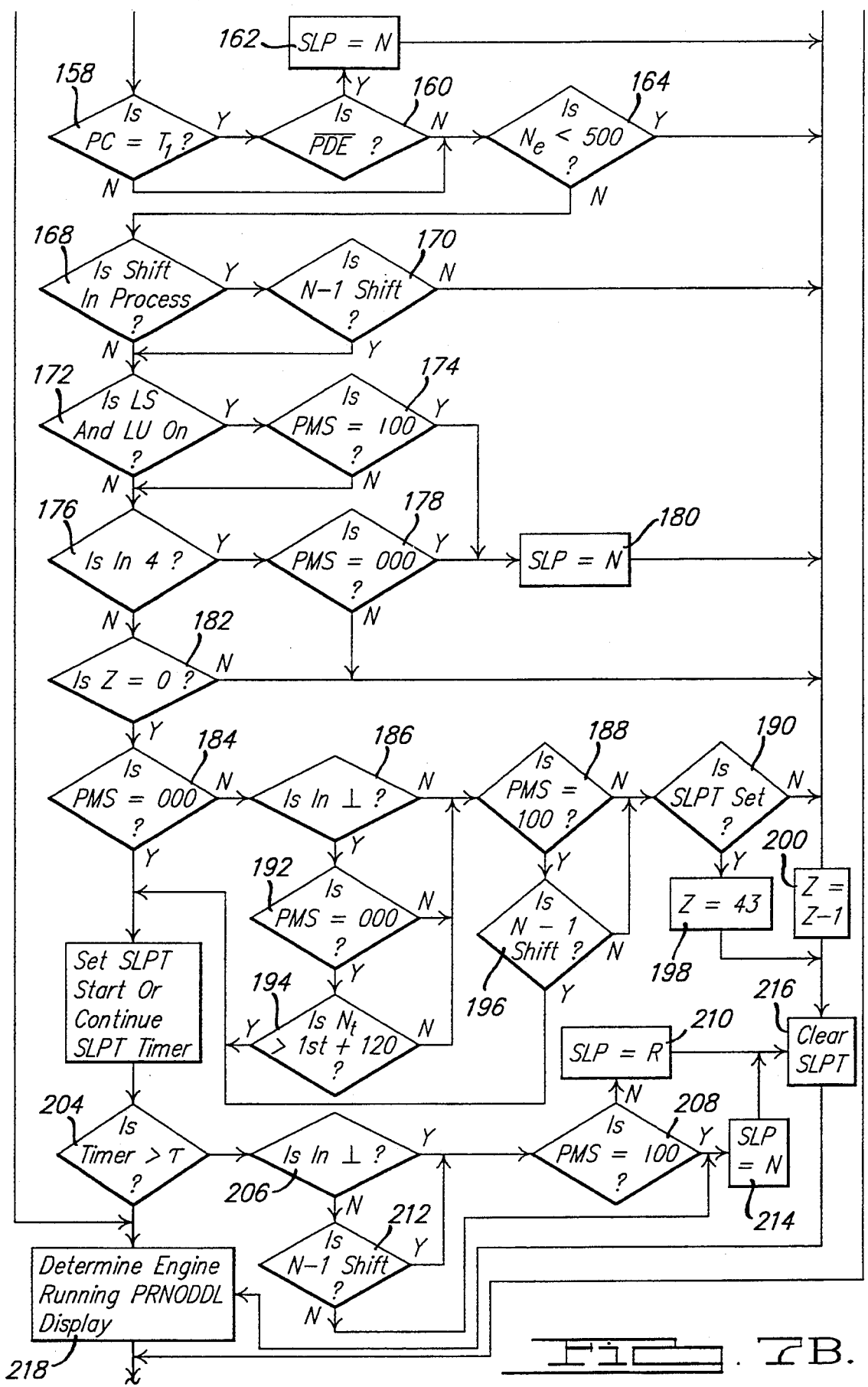
Figure 5A:
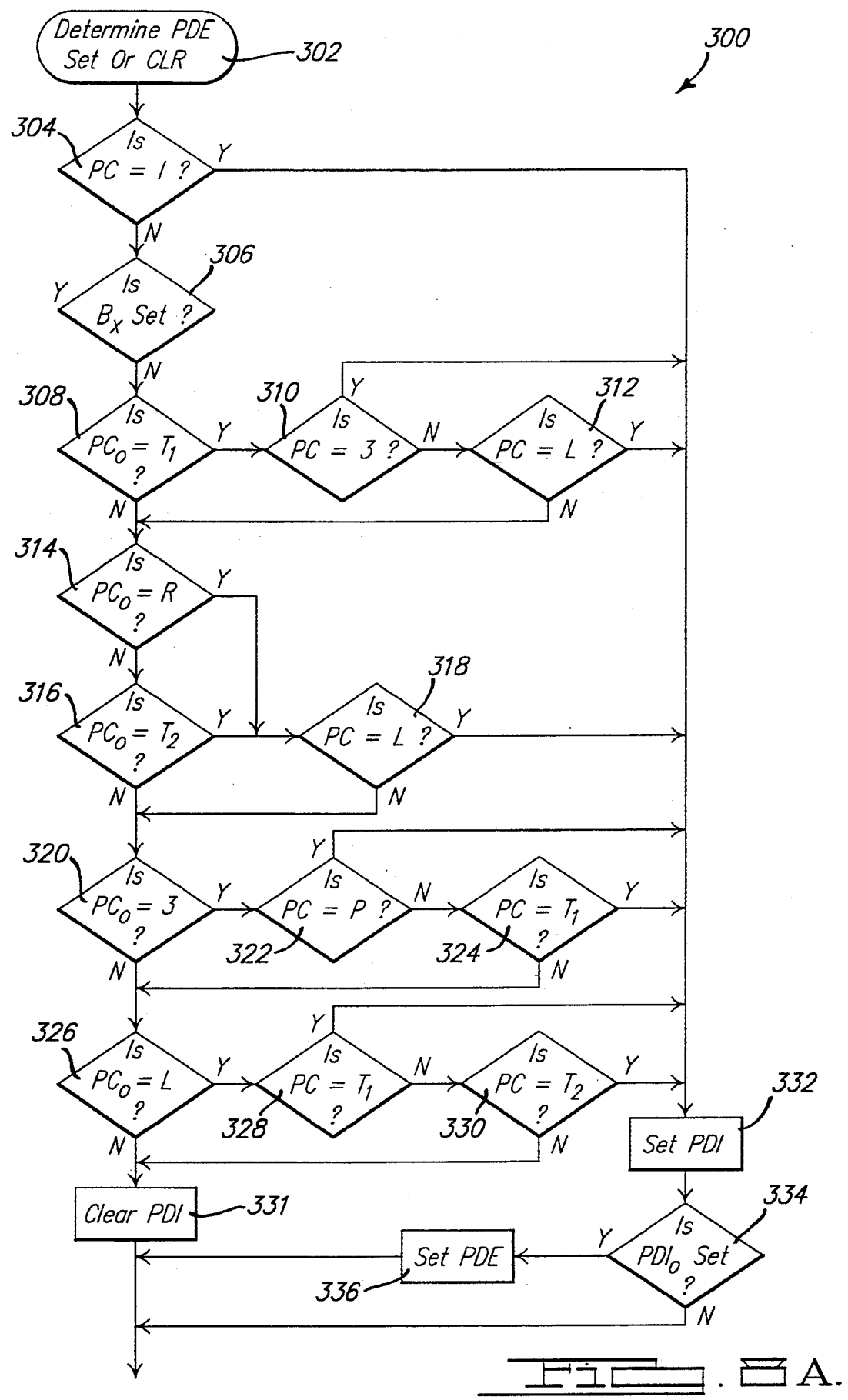

In accordance with the teachings of a preferred embodiment of the present invention, the electronic PRNODDL system of the present invention is thus operable to identify, based upon the manual valve lever sensor data, pressure switch data and transmission input and output speed data, the true transmission operating mode. The flowchart 100 of FIGS. 7A and 7B illustrates the method for determining the PRNODDL display which is either the output of the manual valve lever sensor 12, the shift lever position (SLP) as determined by the SLP method, or an output corresponding to an error condition if one exists. The SLP method determines the actual hydraulic operating state of the automatic transmission, i.e., reverse, R, neutral, N, overdrive, OD, drive, 3, and low, L, and is fully disclosed and described in the aforementioned U.S. Pat. No. 4,965,735 with particular reference to FIGS. 20a and 20b.

The methodology enters at block 102 and proceeds to block 104 where it determines if the PRNODDL data error flag (PDE) is set. The PDE flag is set according to the method shown in flowchart 300 of FIGS. 8a and 8b. The PDE flag is set if two consecutive PRNODDL data invalid (PDI) conditions exist. A PDI condition will result if there is a component failure in the manual valve lever sensor such that it sends invalid binary code distributions or invalid binary code transitions, i.e., a transition from a first valid code to a second valid code but not in the proper sequence. The PRNODDL code is read and checked for each program loop and even when the engine is off, as the transmission controller should continue to process and send the transmission mode data to the body computer and likewise to the instrument cluster display so that the proper PRNODDL position may be displayed. If the PDE flag is set, it is further stored in the battery backed RAM of the transmission controller, however, it is initialized upon battery disconnect.

Figures 8B, 9, 10:
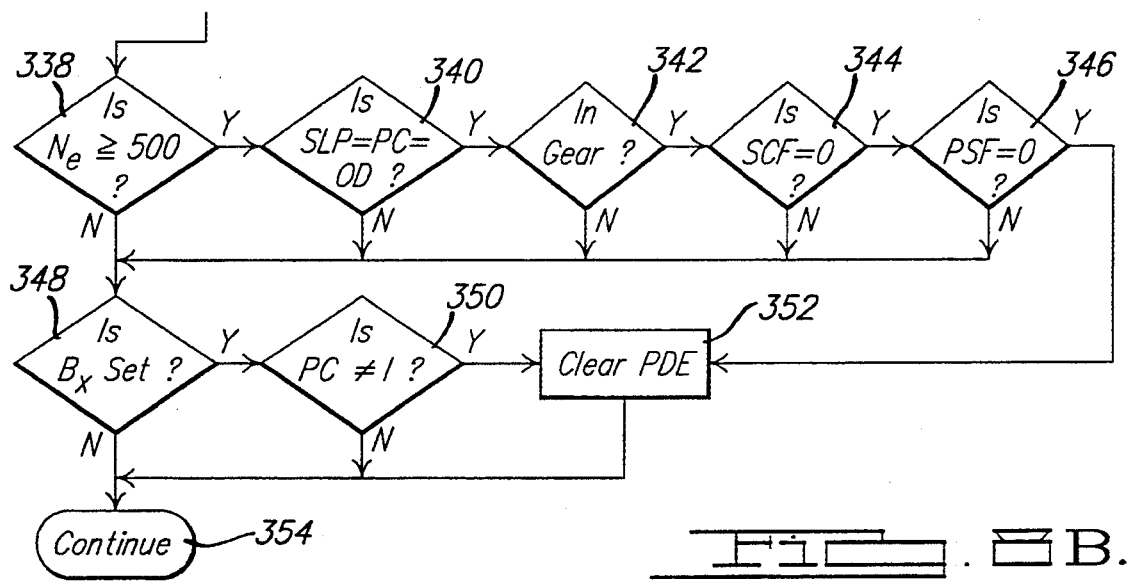

With reference then to FIGS. 8a and 8b, the methodology enters at block 302 and proceeds to diamond 304 where it determines if the PRNODDL code (PC) is valid. The PC is the raw switch input from the manual valve lever sensor 14, and if it is not valid, the method proceeds to block 332 where the PDI condition is set. If the PC is valid, the method proceeds to diamond 306 where it checks if the extreme cold flag ($\beta x$) is set, i.e., the vehicle is operating in an extreme cold condition defined in the preferred embodiment as a start-up transmission temperature less than $-16°$ F. and is cleared when the transmission temperature is above $-12°$ F. If $\beta x$ is set, then the method proceeds to block 331 where the PDI condition is cleared. If $\beta x$ is not set, the method advances to diamond 308 to check if the old PRNODDL code (PCo) is equal to transition 1, T1. If the PCo is T1, then if the PC equals drive, 3, diamond 310, or L, diamond 312, the method proceeds to block 332 to set the PDI condition. Absent the above conditions, the method checks if PCo is reverse, R, or transition 2, T2, diamonds 314, 316, respectively. If either of these conditions exist, and PC is low, L, diamond 318, the PDI condition is set. If not, the method proceeds to diamond 320 and if PCo is 3 and either PC is park, P, diamond 322 or PC is T1, diamond 324, then the PDI condition is set. If not, the method proceeds to diamond 326 and if PCo is L and PC is T1, diamond 328 or PC is T2, diamond 330, the PDI condition is set. If the above conditions are not met, then the PDI condition is cleared at block 331.

If a condition occurs such that the PDI condition is set, block 332, the old PRNODDL data invalid flag (PDI(i−1)), where i is a chronological counter unit, is checked, diamond 334, and if it also is set indicating two consecutive PRNODDL data invalid conditions, the PDE flag is set, diamond 336. The method then proceeds to determine if conditions exist to reset the PDE flag. Thus, if the engine is running, defined by engine speed above a predefined RPM and in the preferred embodiment, Ne > 500 RPM, diamond 338, and the SLP=PC=OD, diamond 340, and the transmission is "in gear", diamond 342, and speed check fault count (SCF) is 0, diamond 344, and the pressure switch fault count (PSF) is 0, the PDE flag is cleared, block 352. The PDE flag can also be cleared if $\beta x$ is set, diamond 348 and the PC is not invalid, diamond 350.

With reference once again to FIGS. 7a and 7b, after determining if the PDE flag is set, the methodology checks whether a PC invalid condition has been set for more than 0.1 seconds, and if so, sets a PRNODDL error, block 106 and proceeds to diamond 108. At diamond 108, if the engine is running (Ne > 500 RPM) and the failsafe flag is not set, the method proceeds to diamond 114. The failsafe flag indicates a transmission error condition which requires prompt service and is more fully described in the aforementioned U.S. Pat. No. 4,965,735. Otherwise, the method determines the engine off PRNODDL display, block 110, sets the SLP to N, block 112, and returns.

The engine off PRNODDL display is set according to the table shown in FIG. 9 and is based upon the previous PRNODDL position input (old PPI) and the new PRNODDL code. The PPI is the instantly updated display position maintained within the transmission controller 12 and can equal P, R, N, OD, 3, L, ALL or OFF. The ALL or OFF conditions illuminate all of the PRNODDL display lamps 34 or none of the PRNODDL display lamps 34, respectively. The P, R, N, OD, 3, and L codes illuminate the PRNODDL display lamp adjacent the appropriate designator (FIG. 1). If the old PPI is neutral, N, and PC is transition 2, T2, the transmission is in a transition area where it may be between reverse, R, and neutral or neutral and overdrive, OD this transition area is indicated by the "*" in FIG. 9. In this case, if the PDE flag is not set, the new PPI is maintained as N for 1 second, and if conditions do not change causing an update of the new PPI, the PPI is set to OFF after the 1 second. If the PDE flag is set, then the new PPI is set to ALL. As can be seen from FIG. 9, the PPI is maintained through the transition regions until an new hydraulic state is reached. For example, as the transmission is shifted from reverse, R, to neutral, N, through T2, the PPI is maintained as R until the neutral zone is entered. A similar situation exists for shifts through T3, 0D is maintained until the drive, 3, mode is reached. An exception to this rule applies to transition zone T1, where the R indication is given immediately after the park, P, position is exited. This is because the park/neutral start prohibit will not allow the vehicle to be started with the transmission in T1, and the R indication will provide the vehicle operator with a visual que as to this condition.

Referring back to FIGS. 7a, 7b and 10, if the engine is running and the failsafe relay is closed, diamond 108, the methodology proceeds to determine the SLP shift lever position. At diamond 114, the methodology checks if the PC is equal to transition 3, T3. If it is, and the SLP is equal to reverse, R or neutral, N, diamond 116, the SLP is set to OD, block 118, otherwise the SLP is already OD, drive, 3, or low L, and the method proceeds to through blocks 200 where count Z is decremented and 216 where the SLP timer is cleared, to block 218 where the engine running PRNODDL display is determined.

At diamond 120 the methodology checks if the PDE flag is set and if it is not, and if the PC is park, P, or neutral, N, diamond 124, but not transition 1, T1, or transition 2, T2, diamond 122 then the SLP is set to N, block 126. If PC is not T1 or T2, diamond 122, and is not P or N, diamond 124, i.e., PC is R, OD, 3 or L, the SLP is set to the PC, block 128. Following blocks 126 or 128, the methodology advances to set the engine running PRNODDL display as described.

If the PDE flag is set, or PC is equal to T1 or T2, the methodology proceeds to diamond 130 and checks if the SLP is reverse, R. If the SLP is reverse, R, the methodology advances to block 132 and turns on the low/reverse clutch solenoid actuated valve 94 (FIG. 6) and then advances to diamond 134 to determine if the output of low/reverse pressure switch, LRP, 88 is equal to one. This is accomplished by checking the pressure switch mask (PSM) which is the outputs of LRP 88, 2/4P 90 and ODP 92 and for example, PSM 100, means LRP=1, 2/4P=0, ODP=0. If LRP is one, then the SLP is set to neutral, N, block 126. If LRP does not equal one, then the SLP is maintained in reverse, R. The methodology then advances to set the engine running PRNODDL display as described.

If the SLP was not reverse, R, but instead is neutral, N, diamond 138, the methodology advances to diamond 140 and if PC does not equal T1, the SLP test flag is set, block 142. If PC is equal to T1, the methodology advances to diamond 150, and checks if the low/reverse solenoid 94 is on, if pressure switches 88-92 are on, diamond 152 and if the engine is running, diamond 154. If each of these conditions exist, the SLP is set to reverse, R, block 156, otherwise, the SLP remains neutral, N. The methodology then advances to set the engine running PRNODDL display as described.

After setting the SLP test flag at block 142, the methodology advances to block 146 and sets a count Z on a counter equal to a predetermined value, in the preferred embodiment, 43. The methodology then advances to block 148 and sets the SLP to overdrive OD. This is because overdrive clutch 96 is being applied when the overdrive pressure switch, 92 is pressurized and thereby producing a signal equal to one (see FIG. 6), and the methodology advances to set the engine running PRNODDL display as described.

At diamond 158, if PC is T1, and the PDE flag is not set, diamond 160, the SLP is set to neutral, N, and the methodology advances to set the engine running PRNODDL display as described. If either PC is not T1 or the PDE flag is set, then the methodology advances to diamond 164 and if the engine is not running, i.e., the engine RPM is less than a preset value and in the preferred embodiment, Ne<500 RPM, diamond 164, then the SLP is overdrive, OD, drive, 3 or low, L, and the methodology advances to set the engine running PRNODDL display as described.

If at diamond 164, the engine is running, i.e., the engine RPM is above a predetermined value, then the methodology checks to see if a shift is in progress by checking a flag, diamond 168. If a shift is in progress, the methodology further checks to see if the shift is a neutral to first gear shift by checking a flag, diamond 170. If it is not a neutral to first gear shift, the SLP remains OD, 3 or L, and the methodology advances to determine the engine running PRNODDL display as described. If the shift is not in progress, or a neutral to first gear shift is in progress, the methodology advances to diamond 172 and determines whether the LU switch valve 98 is being applied as a result of the low/reverse element solenoid-actuated valve 94 being energized or on and LRP 88 equal to one and both 2/4P and ODP 90 and 92, respectively, equal to zero, diamond 174. If that criteria is true, the methodology advances to block 180 and sets the SLP equal to neutral. If the criteria is not true, the methodology advances to diamond 176 and determines whether the transmission is in fourth gear by calculating the transmission input Nt and output No speeds. If the transmission is in fourth gear, the methodology advances to diamond 178 and determines whether pressure switches 88-92 equal zero. If the pressure switches equal zero, the methodology advances to block 180 and sets the SLP to neutral. If all of the switches do not equal zero, then the SLP remains OD, 3 or L. The methodology then advances to set the engine running PRNODDL display as described.

If the transmission is not in fourth gear, the methodology advances to diamond 182 and determines whether count Z equals a predetermined value, in the preferred embodiment, zero. If Z does not equal zero, the methodology advances to set the engine running PRNODDL display as previously described. If Z equals zero, the methodology advances to diamond 184 and the methodology determines if pressure switches 88–92 are all zero; or if the transmission is in first gear, diamond 186 and the LRP 88 is equal to one, diamond 188 and the input speed, Nt, is greater than a predetermined RPM; or if the LRP 88 is equal to one and a neutral to first shift is in progress. If all these criteria are not true, the methodology advances to diamond 190 and determines if the SLP test flag has been set. If it has not been set, the methodology advances to determine engine running PRNODDL display as previously described. If the SLP test flag is set, the methodology advances to block 198 and sets the count Z to a predetermined value. The methodology then advances to determine engine running PRNODDL display as previously describe, however, without decrementing the count Z, block 200.

If any of the criteria is true, the methodology advances to block 202 and sets the SLP test flag and starts or continues a SLP timer (SLPT). The methodology then advances to diamond 204 and if the timer value is not greater than a preset value, $\tau$, the methodology determines the engine running PRNODDL display, block 218. In the preferred embodiment, $\tau$ is a function of temperature and is equal to:

0.15 second if the transmission is hot;
0.25 second if the transmission is warm; and
0.8 second if the transmission is cold.

If the timer value is greater than $\tau$, then the methodology advances to diamond 206 and determines if the transmission is in first gear by performing speed calculations between transmission input and output speeds, Nt and No. If the transmission is not in first gear, the methodology determines if a neutral to first shift is in progress, diamond 212. If the transmission is not in first gear or a neutral to first gear shift is not in progress, the SLP is set to neutral, N, block 214, the SLPT is cleared, and the engine running PRNODDL display is determined, block 218. If either the transmission is in first or a neutral to first shift is in progress, then the methodology advances to diamond 208 and determines if the LRP 88 is equal to one. If it is not, then the SLP is set to reverse, R, block 210, the SLPT is cleared and the engine running PRNODDL display is determined, block 218. If the LRP 88 is equal to one, then the SLP is set to neutral and the SLPT is cleared and the engine running PRNODDL display is determined as described. After the engine running PRNODDL display is determined, block 218, or after the engine off PRNODDL display is determined, block 110, and the SLP is set to neutral, N, block 112, the methodology returns.

Figures 11, 12:
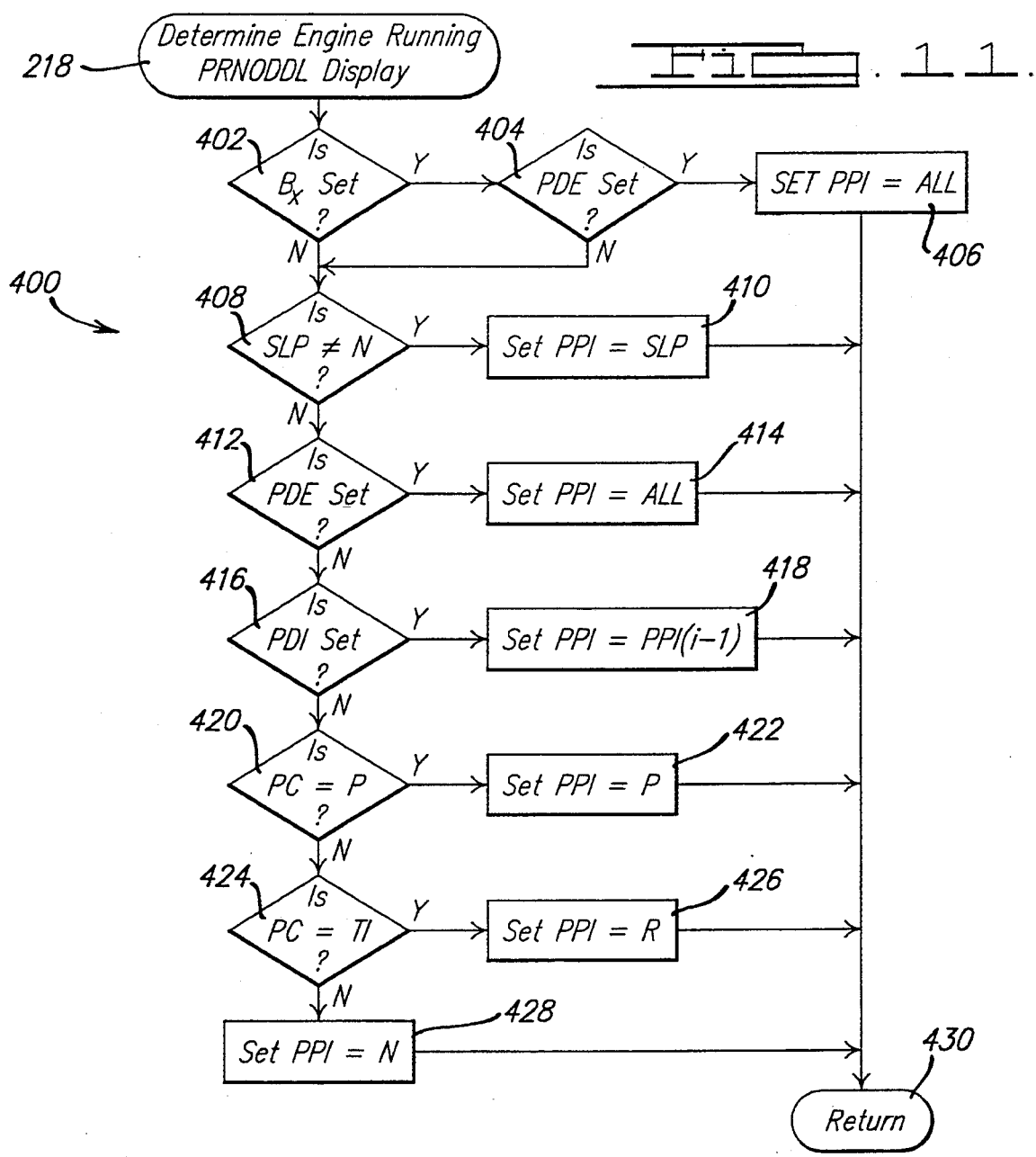
FIG. 11 is a flowchart for a method of determining the engine running PRNODDL display.
FIG. 12 is a table used in conjunction with the present invention for determining the PRNODDL position displayed.

With reference to FIG. 11, flowchart 400 illustrates the method of determining the engine running PRNODDL display corresponding to block 218 of FIGS. 7a and 7b. The methodology enters at block 218 and proceeds to diamond 402 where the methodology determines if the extreme cold flag $\beta x$ is set. If it is set, the methodology advances to diamond 404 and determines if the PDE flag is set, and if it is, PRNODDL position input (PPI) is set to ALL, block 406. Otherwise, the methodology advances to diamond 408 and determines if the SLP is not equal to neutral, N. If the SLP is not equal to neutral, N, the PPI is set to the SLP, block 410. If the SLP is equal to neutral, N, the methodology proceeds to diamond 412 and determines if the PDE flag is set. If the PDE flag is set, then the PPI is set to ALL, block 414, otherwise the methodology proceeds to diamond 416 and determines if the PDI condition is set. If the PDI condition is set, then the PPI is set to the old PPI, i.e., PPI (i−1) where i is a chronological counter unit, block 418. Otherwise, the methodology advances to diamond 420 and determines if PC is equal to park, P. If it is, then the PPI is set to park, block 422. If PC is not equal to park, it is again checked to determine if it is equal to T1, diamond 424, and if it is, then the PPI is set to reverse, block 426, otherwise, the PPI is set to neutral, block 428. After setting the engine running PRNODDL display, the methodology returns at bubble 430.

With respect to setting the PPI to reverse when the PC is equal to T1 with the engine running, as the transmission is shifted from Park, the parking sprag is released while the transmission is in T1. Therefore, to provide an indication to the vehicle operator that the transmission is no longer locked via the parking sprag, the PRNODDL display is immediately changed to reverse, R. Alternatively, it is possible to maintain the P indication for a period of time, for example 0.7 second, until either a reverse condition, PC=R or SLP=R, occurs in which case the reverse indicator lamp 34 is illuminated. If the transmission is shifted back to park before the time period expires the PRNODDL display maintains the Park indication. It is still further possible, to highlight the fact that the transmission is in a transition zone, by simultaneously illuminating a plurality of the PRNODDL indicators lamps 34 or to flash on and off one or more PRNODDL indicators lamps 34.

As previously stated, the transmission controller 12, processes the manual valve lever sensor 14, pressure switches 88–92 92 and input, Nt, and output, No, speed data signals to generate the PRNODDL position input. This signal is then sent via serial data bus 26 to the body computer 28 as the PRNODDL position transmitted (PPT) signal and represents the transmission operating mode, and thus the PRNODDL position to be displayed. In operation, PPT is equal to the PPI, or if there is a problem in communicating the PPT, as will be discussed, it is equal to the previous PPT sent, i.e., PPT(i−1), where i is a chronological counter unit.

The PPT, as sent on the serial data bus 26, must meet the communications requirement of the serial data bus as more fully described in the aforementioned U.S. Pat. Nos. 4,706,082, 4,719,458, 4,739,323, 4,739,324 and 4,724,349, and includes a header message, the command message, i.e., PPT equal to one of the eight PRNODDL display commands and a checksum to provide a means for verifying the command has been received. Because of the importance of the PRNODDL display message, it is given fairly high priority on the serial data bus and thus has authority to prohibit other messages from using the bus. However, it is possible that a rapid number of changes to the PRNODDL position, for example, as a result of the vehicle operator rapidly shifting shift lever 2 from park, P, to overdrive, OD, could flood the serial bus and thereby cause communication difficulties for other systems using the serial bus. Therefore, the PPT is sent with a maximum frequency. In the preferred embodiment, a flag is provided, the transmit PPT flag (TPF) which is used to limit the maximum PPT message frequency. The TPF is set 0.049 seconds after it is cleared. It is cleared with PPT not equal to PPT(i−1). Thus the PPT is limited in transmission frequency to conditions where the PPI does not equal the PPT and the TPF is set, or at 0.896 second intervals in order to provide an update signal.

As previously mentioned, the transmittal of the PPT is monitored via a checksum to confirm that the message was successfully sent. If the message is not successful, the message is attempted two more times at the earliest opportunity. Otherwise, the message Is sent when the above described conditions are met.

The PPT is sent to the body computer 28. It should be appreciated, however, that the following processing could as easily be completed within the transmission controller 12 or the instrument panel decoder circuit 32, if it is equipped with such processing capabilities, and in the preferred embodiment, the processing is advantageously completed in body computer 28.

The PRNODDL position displayed (PPD), the actual position illuminated on the instrument panel or other PRNODDL display, must be adjacent the previously displayed PRNODDL position and must remain illuminated for a sufficient period of time such that the vehicle operator may perceive each displayed position. This requirement contemplates rapid shift lever 2 movements and providing for a uniform progression through each of the PRNODDL positions.

The PRNODDL position received (PPR) retains the last PPT from the transmission controller 12 and is updated as follows. The PPR is OFF at start-up and following the bulb check sequence where all of the PRNODDL display lights 34 are illuminated. The PPR is then equal to a validly received PPT even if the valid PPT is received during bulb check sequence. If a PPT is not received in over 8 seconds, the PPR is set to ALL and in addition this error indication, a "loss of PRNODDL display input" code is set in the body computer for diagnostic purposes. In all other conditions, the PPR is equal to the previous PPR, PPR(i−1), where i is a chronological counter unit.

The PPD is ALL at start-up during the bulb check sequence, and thereafter is set according to the table shown in FIG. 12. The PPD is only updated when the inhibit display change flag (IDC) is not set. The IDC flag is set when PPD(i) is not equal to PPD(i−1). The IDC flag is cleared when PPD(i) is equal to PPD(i−1) for a predetermined time period, which in the preferred embodiment is 0.0625 seconds. As previously discussed, the frequency at which the PPT is updated is limited to reduce traffic on serial bus 26. In order to avoid additional delay in the update of the PPD, however, the TPF interval should be less than the IDC flag interval.

Once a PPD is determined by the body computer 28, it is sent via serial data bus 26 as binary code to the instrument cluster PPD decoder chip 32. The PPD decoder circuit 32 decodes the binary data and illuminates the appropriate PRNODDL display lamp 34 in a well known manner thereby indicating transmission operating mode to the vehicle driver.

It should be understood that the present invention has been described in an illustrative manner. Therefore, the terminology which has been used is intended to be in the nature of words of description rather than limitation. Many modifications and variations of the present invention are possible in light of the above teachings. Therefore, within the scope of the appended claims, the present invention may be practiced otherwise than as specifically described.

What is claimed is:

1. In an electronically controlled automatic transmission, a system for displaying the transmission operating mode comprising;
    means for detecting the hydraulic operating modes of the transmission;
    means for detecting the currently selected shift position of the transmission;
    means for detecting the transmission input and output speeds; and
    processing means for producing a transmission first operating mode signal in response to the transmission shift position when the transmission is in a first operating mode, and for producing a second transmission operating mode signal in response to the hydraulic operating mode and the transmission input and output speeds when the transmission is in a second operating mode.

2. The system according to claim 1 wherein the processing means includes a transmission controller and a body computer, said transmission controller being responsive to each of a transmission position signal from the means for detecting the hydraulic operating modes, a gear shift lever position signal from the means for detecting the selected shift position and speed signals from the means for detecting the transmission input and output speeds, said body computer being responsive to the transmission operating mode signal from the transmission controller.

3. The system of claim 1 further comprising means responsive to the transmission operating mode signal for producing an indication of the transmission operating mode.

4. The system according to claim 3 wherein the means responsive to the transmission operating mode signal is an electronic instrument panel display displaying park, reverse, neutral, overdrive, drive and low displays.

5. The system according to claim 1 wherein the means for detecting the currently selected shift position includes a manual valve lever position sensor that is responsive to the position of a gear select lever, said position sensor providing predetermined binary coded combinations for a plurality of transmission operating modes.

6. The system according to claim 5 wherein the manual valve lever position sensor includes four spring loaded electrical contact pins that contact conductive and non-conductive areas on a contact surface of a metal plate that is rotatable with a shift shaft, said shift shaft rotating in response to the position of the gear select lever.

7. The system according to claim 5 wherein the manual valve lever position sensor provides transition codes when the gear select lever is being shifted between different transmission operating modes.

8. The system according to claim 7 wherein the processing means is responsive to the means for detecting the hydraulic operating modes so as to determine the transmission operating mode when the manual valve lever position sensor provides the transition codes.

9. The system according to claim 1 wherein the means for detecting the hydraulic operating modes includes a plurality of pressure switches.

10. The system according to claim 9 wherein the plurality of pressure switches includes three pressure switches, said three pressure switches being a low/-reverse pressure switch, a 2/4 pressure switch and an overdrive pressure switch.

11. The system according to claim 1 wherein the means for detecting the transmission input and output speeds includes speed sensors positioned at the input and the output of the transmission.

12. The system according to claim 11 wherein the processing means is responsive to the transmission input and output sensors to determine whether the transmission is in a first gear.

13. A system for determining a transmission operating mode of an automatic transmission, said system comprising:
- a manual valve lever position sensor, said manual valve lever position sensor sensing transmission positions of a manual gear select lever, said position sensor providing predetermined coded signals indicative of the transmission positions and predetermined coded signals indicative of transition positions when the gear select lever is between the transmission positions;
- a plurality of pressure switches, said pressure switches identifying hydraulic operating modes of the transmission, said pressure switches providing signals of the transmission operating modes; and
- a transmission controller responsive to the coded signals from the position sensor and the transmission operating mode signals from the pressure switches, said transmission controller operable to determine a transmission operating mode when the position sensor provides a transition code.

14. The system according to claim 13 wherein the manual valve lever position sensor includes four spring loaded electrical contact pins that contact conductive and non-conductive areas on a contact surface of a metal plate that is rotatable with a shift shaft, said shift shaft rotating in response to the position of the gear select lever.

15. The system according to claim 13 wherein the plurality of pressure switches includes three pressure switches including a low/reverse pressure switch, a 2/4 pressure switch and an overdrive pressure switch.

16. The system according to claim 13 further comprising a transmission input speed sensor and a transmission output speed sensor that sense the transmission input and output speeds, wherein the transmission controller generates a transmission operating mode signal indicative of a transmission operating mode in response to a combination of the transmission operating modes from the pressure switches and the transmission input and output speeds.

17. The system according to claim 13 further comprising a body computer, said body computer being responsive to the transmission operating mode signal from the transmission controller, said body computer processing the transmission operating mode signal.

18. The system according to claim 13 further comprising an instrument panel display that is responsive to the transmission operating mode signal from the transmission controller, said instrument panel display displaying the transmission mode.

19. A system for determining a transmission operating mode of an automatic transmission, said system comprising:
- a manual valve lever position sensor, said manual valve lever position sensor sensing transmission positions of a manual gear select lever, said position sensor providing predetermined coded signals indicative of the transmission positions and predetermined coded signals indicative of transition positions when the gear select lever is between the transmission positions;
- a plurality of pressure switches, said pressure switches identifying hydraulic operating modes of the transmission, said pressure switches providing signals of the transmission operating modes;
- a transmission input speed sensor and a transmission output speed sensor that detect the transmission input and output speeds; and
- a transmission controller responsive to each of the coded signals from the position sensor, the transmission operating mode signals from the pressure switches, and the transmission input and output speeds from the transmission input and output speed sensors, said transmission controller generating a first transmission operating mode signal in response to the position sensor when the transmission is in a first operating mode, and generating a second transmission operating mode signal in response to the hydraulic operating mode and the transmission input and output speeds when the transmission is in a second operating mode.

20. The system according to claim 19 wherein the plurality of pressure switches includes three pressure switches including a low/reverse pressure switch, a 2/4 pressure switch and an overdrive pressure switch.

* * * * *